United States Patent
Merhar et al.

(10) Patent No.: US 8,496,236 B2
(45) Date of Patent: Jul. 30, 2013

(54) CLAMP

(71) Applicant: Hilti Aktiengesellschaft, Schaan (LI)

(72) Inventors: Thomas Merhar, Schaan (LI); Ralph Lippuner, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/711,294

(22) Filed: Dec. 11, 2012

(65) Prior Publication Data
US 2013/0149030 A1 Jun. 13, 2013

(30) Foreign Application Priority Data
Dec. 12, 2011 (EP) .................................... 11193090

(51) Int. Cl.
*B25B 5/02* (2006.01)
(52) U.S. Cl.
USPC .................. 269/3; 269/6; 269/45; 248/231.7; 248/228.1
(58) Field of Classification Search
USPC ............. 269/3, 6, 45, 228, 246, 95, 152, 209; 248/231.7, 228.1, 249
See application file for complete search history.

(56) References Cited

U.S. PATENT DOCUMENTS

| | | | | |
|---|---|---|---|---|
| 1,477,219 A * | 12/1923 | Halvorsen | ........................ | 269/60 |
| 2,877,815 A * | 3/1959 | Fonken | ............................. | 269/9 |
| 3,359,839 A * | 12/1967 | Miller | ................................. | 81/6 |
| 4,108,589 A * | 8/1978 | Bunch | ........................... | 425/393 |
| 4,607,829 A * | 8/1986 | Suska | ............................. | 269/88 |
| 5,090,670 A * | 2/1992 | Yang | ............................. | 269/249 |
| 5,435,533 A * | 7/1995 | Weinmann, Jr. | .............. | 269/228 |
| 5,730,433 A * | 3/1998 | Veres | ............................. | 269/41 |
| 7,000,519 B1 * | 2/2006 | Weinstein et al. | ......... | 83/435.27 |
| 7,128,313 B1 * | 10/2006 | Pliley | ............................. | 269/95 |
| 7,891,618 B2 * | 2/2011 | Carnevali | ................... | 248/228.6 |
| 2007/0108684 A1 * | 5/2007 | Webb | ............................. | 269/228 |
| 2008/0073823 A1 * | 3/2008 | Lin | ............................. | 269/228 |

FOREIGN PATENT DOCUMENTS

| DE | 92 04 055 U1 | 7/1992 |
|---|---|---|
| DE | 20 2009 015 756 U1 | 3/2010 |
| DE | 20 2010 006 322 U1 | 9/2010 |

* cited by examiner

*Primary Examiner* — Lee D Wilson
(74) *Attorney, Agent, or Firm* — Crowell & Moring LLP

(57) ABSTRACT

A clamp for linking a mounting rail to a flange of a beam is disclosed. The clamp includes a lower base, an upper base, a connecting web, and a T-shaped back-gripping element, which is disposed at the lower base for gripping a rail opening of the mounting rail from behind. In the upper base, a threaded hole, which corresponds to the lower T-shaped back-gripping element, is provided for a clamping screw, with which the flange and the mounting rail can be pressed against one another when the lower T-shaped element grips a rail opening of the mounting rail from behind. In the lower base, a threaded hole, which corresponds to an upper T-shaped back-gripping element, is provided for a clamping screw, with which the flange and the mounting rail can be pressed against one another when the upper T-shaped element grips a rail opening of the mounting rail from behind.

18 Claims, 2 Drawing Sheets

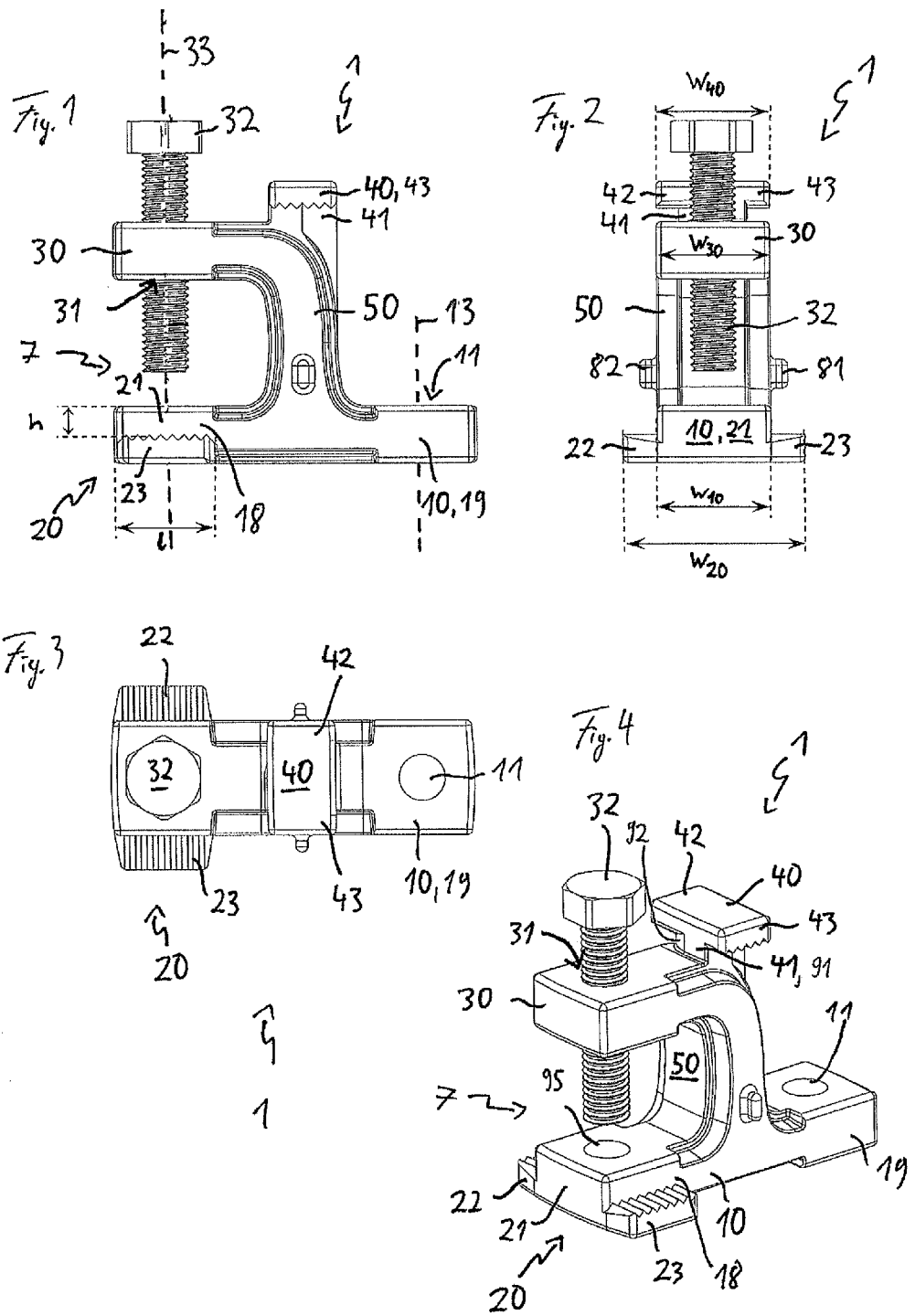

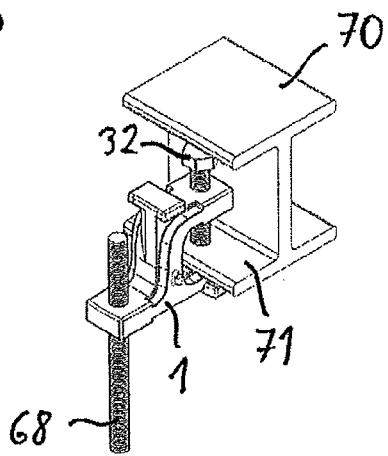
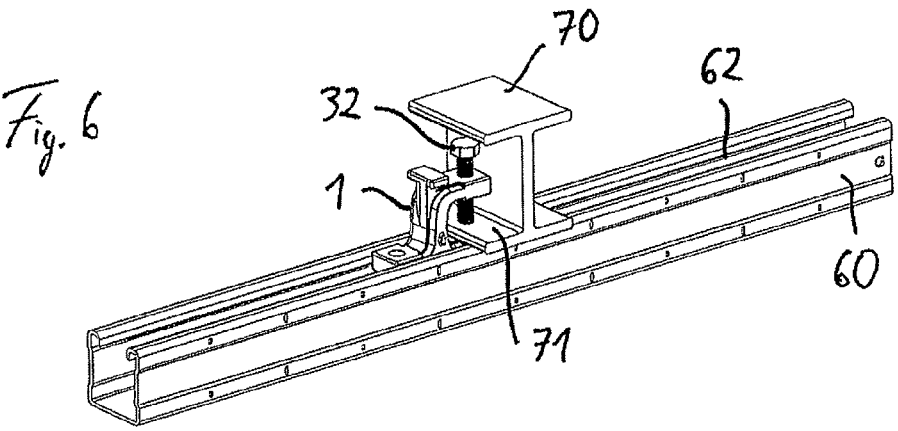
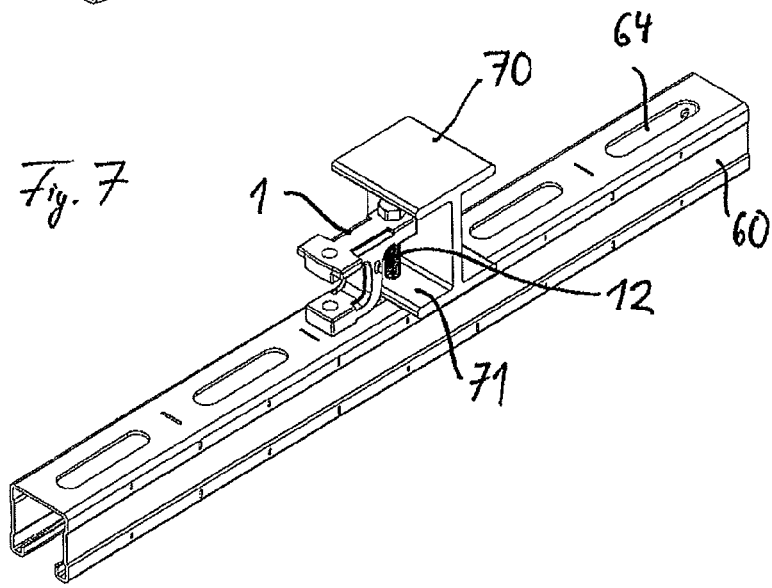

CLAMP

This application claims the priority of European Patent Document No. EP 11193090.5, filed Dec. 12, 2011, the disclosure of which is expressly incorporated by reference herein.

BACKGROUND AND SUMMARY OF THE INVENTION

The invention relates to a clamp for linking a mounting rail to a flange of a beam, especially a T-beam, a double T-beam or a Z-beam. Preferably, the clamp can also be used to link a threaded rod to the beam.

In the field of house technology, rail systems, generally with C-shaped rails, are used to secure pipes for heating, for hot water, for venting, for air conditioning, etc. In industrial buildings, T-beams and double T-beams are used as roof construction elements. Connecting elements are therefore required, which are able to connect the rails with the T-beams and the double T-beams.

A clamp, suitable for this purpose, is known from German Patent Document No. DE 20 2009 015 756 U1.

Further mounting units for fastening to T-beams are known from German Patent Document Nos. DE 20 2010 006 322 U1 and DE 92 04 055 U1.

The object of the invention is to provide a clamp for linking a mounting rail to a flange of a beam, the mounting clamp ensuring versatility and, at the same time, being particularly simple and reliable.

The invention provides a clamp for linking a mounting rail to a flange of a beam; with a lower base; an upper base; a connecting web, which connects the lower base and the upper base with one another; and a T-shaped element, which is disposed at the lower base and is intended for gripping a rail opening of the mounting rail from behind, wherein, in the upper base, an upper threaded hole, which corresponds to the lower T-shaped back-gripping element, is provided for a clamping screw, which presses the flange and the mounting rail against one another when the lower T-shaped element grips an opening of the mounting rail from behind, and an upper, T-shaped back-gripping element, disposed at the upper base, for gripping an opening of the mounting rail from behind, wherein, in the lower base, a lower threaded hole for a clamping screw is provided, which corresponds to the upper, T-shaped back-gripping element, with which the flange and the mounting rail can be pressed against one another when the upper T-shaped element grips a rail opening of the mounting rail from behind.

A first basic concept of the invention can be seen in providing the clamps with T-shaped back-gripping elements, which can be introduced into the rail openings of the mounting rail and grip these rail openings from behind for positively fastening the clamp to the mounting rail. A corresponding threaded hole for a clamping screw is assigned to each of the T-shaped back-gripping elements. The clamping screw can act on the flange of the beam in such a manner that the flange, from the outside of the rail, and the corresponding T-shaped back-gripping element, introduced into the rail opening from the inside of the rail, are pressed against the mounting rail. In this way, the clamp can secure the flange to the mounting rail.

A further basic concept of the invention comprises equipping each clamp with two or more such T-shaped back-gripping elements, a corresponding threaded hole for a corresponding clamping screw being assigned to each T-shaped back-gripping element. With that, the inventive clamp may be used in several space orientations, so that it has a particularly large area of use. Preferably, the two T-shaped back-gripping elements may have different dimensions, particularly, heads of different widths, so that they can be connected to rail openings of different dimensions. For example, the upper T-shaped element may be provided for gripping behind the elongated holes of the mounting rail, whereas the lower T-shaped element serves for gripping behind the longitudinal slots of the opening of the mounting rail. With that, one and the same clamp can be used to link different rail types to the profile or a mounting rail with different recesses can be linked in different space orientations. Accordingly, the range of applications can be increased even further.

Basically, the inventive clamp can be positioned in any arrangement in space. The reference surface, to which the concepts of "top" and bottom of the invention refer, need not be the surface of the earth. In particular, the invention also comprises such an arrangement, for which the upper T-shaped, back-gripping element is closer to the surface of the earth than the lower T-shaped, back-gripping element, and for which the upper threaded hole is closer to the surface of the earth than the lower threaded hole.

Pursuant to the invention, the two T-shaped back-gripping elements may have a central leg and two wings, protruding therefrom.

Preferably, the lower T-shaped back-gripping element has a larger wing span than the upper T-shaped back-gripping element. With that, the lower T-shaped back-gripping element may be provided for linking to wider dimensioned rail openings than the upper T-shaped back-gripping element. The wing-span is understood to be, in particular, the distance between the two wing tips of the respective T-shaped back-gripping elements.

In particular, the lower T-shaped back-gripping element may have a wingspan, which is larger than a width of the lower base, which is measured parallel to the wingspan. In accordance with this embodiment, the wings of the lower T-shaped back-gripping element protrude laterally beyond the lower base. This embodiment permits linking to relatively wide rail openings, for example, at the longitudinal slot of the mounting rail, with a comparatively low expenditure for materials.

Additionally or alternatively, the upper T-shaped back-gripping element may have a wingspan, which is smaller than or equal to the width of the upper base, measured parallel to the wingspan. In accordance with this embodiment, the wings of the upper T-shaped back-gripping element of the upper base are set back laterally or flush therewith. This embodiment permits linking to narrower rail openings, for example, at elongated holes of the mounting rail, while the clamp is equally stiff.

In a further preferred embodiment of the invention, the center leg of the lower T-shaped back-gripping element is formed, preferably completely, by the lower base. Accordingly, the lower base and at least a portion of the lower center leg are constructed integrally. This particularly compact arrangement may be provided especially when the lower T-shaped back-gripping element serves for linking to the elongated slot of the mounting rail.

Additionally or alternatively, the center leg of the upper T-shaped back-gripping element may be offset from the upper base. This may include, in particular, that the center leg of the upper T-shaped back-gripping element is narrower than the upper base, particularly in a direction extending parallel to the wingspan, and/or that it protrudes from the upper base. In accordance with this embodiment, the upper T-shaped back-gripping element may also serve for linking to relatively narrow rail openings.

The two threaded holes preferably have the same diameter and, in particular, also the same thread parameters, so that one and the same clamping screw can be used in both threaded holes. The lower and the upper threaded holes—that is, the longitudinal axes thereof—preferably proceed parallel to one another. Pursuant to the invention, the lower and the upper threaded holes are through holes. The lower and the upper threaded holes each have at least one internal thread.

In accordance with an advantageous further development of the inventive clamp, the latter contains a U shape with an internal space for accommodating the flange, the internal space being formed by the upper base, the connecting web and at least one part of the lower base, especially by the front base leg of the clamp, as is explained in greater detail below. By these means, a particularly simple and reliable linking to the flange can be ensured, especially since the U shape can surround the flange on three sides.

Preferably, the lower T-shaped back-gripping element and/or the upper T-shaped back-gripping element are disposed at the U shape. By these means, a particularly compact and, at the same time, particularly stiff arrangement may be obtained.

Basically, the lower T-shaped back-gripping element may extend over the whole length of the lower base. In this case, however, the clamp would have to be pushed in from the end into the elongated slot of the mounting rail. It is therefore particularly preferred if the clamp can be inserted by rotation into the rail opening. In particular, provisions may be made so that the lower T-shaped back-gripping element is disposed offset with respect to the connecting web at the lower base in such a manner that the mounting rail can be inserted by rotation.

In an advantageous embodiment of the clamp, the longitudinal axis of the upper threaded hole passes through the lower T-shaped back-gripping element. Any unintentional tilting of the clamp while tightening the clamping screw, inserted in the upper threaded hole, can be prevented since, in the case of this embodiment, the axial vector of the clamping force of a clamping screw inserted in the upper threaded hole points in the direction of the corresponding lower T-shaped back-gripping element. In particular, the longitudinal axis of the upper threaded hole may pass through the accommodating space of the U-shape.

Furthermore, it is advantageous that the longitudinal axis of the lower threaded hole is offset with respect to the upper T-shaped back-gripping element. In accordance with this embodiment, the longitudinal axis of the lower threaded hole therefore does not pass through the upper T-shaped back-gripping element. This makes it possible for the clamp to be linked also to smaller openings of the mounting rail.

The longitudinal axis of a threaded hole can be interpreted, in particular, as being an imaginary, infinitely extending straight line that passes through the center of the threaded hole and around which the thread of the threaded hole revolves.

Preferably, the lower base may have a front base leg and a rear base leg, the web, connecting the front base leg to the rear base leg protruding from the lower base. In accordance with this embodiment, the lower base protrudes at two opposite sides over the connecting web, as a result of which a particularly compact construction and a particularly high diversity are provided. Preferably, the front base leg is disposed below the upper base; this means that the aforementioned U shape can be formed by the front base leg of the lower base, the connecting web and the upper base leg. In particular, the lower T-shaped back-gripping element may be disposed at the front base leg and/or the lower threaded hole at the rear base leg. The front base leg may also have additional linking openings, which may also have threads. The upper base and/or the lower base and particularly the base leg thereof are disposed at right angles to the connecting web.

A particularly compact construction may be provided advantageously owing to the fact that the upper base of the connecting web and the lower base form a p shape. For this purpose, for example, the lower base, particularly with in each case one of the two base legs, may protrude at two opposite sides of the connecting web from the connecting web, whereas the upper base protrudes at only one side of the connecting web from the connecting web. In particular, the longitudinal axis of the lower threaded hole can pass through the clamp only in the lower base. The aforementioned U shape can form a part of the p shape.

It is particularly preferred if the upper base, the lower base and, advantageously, also the connecting web have the same width. This may be advantageous with respect to the manufacturing process and the stiffness of the clamp.

Furthermore, it is advantageous if the connecting web extends between the longitudinal axis of the upper threaded hole and the longitudinal axis of the lower threaded hole. In accordance with this variation, the two longitudinal axes and, accordingly, the two threaded holes are on opposite sides of the connecting web. In particular, the clamp may have a Z shape, consisting of the upper base with the upper threaded hole, the connecting web and that part of the lower base, which contains the lower threaded hole, that is, preferably, the rear base leg.

At least two securing pins may be disposed at the connecting web, particularly on opposite sides of the connecting web. The securing pins can prevent the clamp from falling through the longitudinal slot of the mounting rail into the mounting rail, before the clamp is fixed to the flange with the clamping screw. Accordingly, the securing pins advisedly are wider than the center leg of the lower T-shaped back-gripping element, particularly measured parallel to the wingspan of the lower back-gripping element.

The lower, T-shaped back-gripping element and/or the upper T-shaped back-gripping element preferably have or has a denticulation for increasing the friction of the mounting rail. This denticulation is disposed preferably at least at the respective wings.

The invention also comprises an arrangement consisting of an inventive clamp, a beam with a flange and, preferably, a mounting rail, wherein a clamping screw, which clamps the clamp and, optionally, the mounting rail to the flange, is disposed in one of the two threaded holes of the clamp. If a mounting screw is present, the clamp, as described, can grip, with its upper T-shaped back-gripping element, an elongated hole of the mounting rail or, with its lower T-shaped back-gripping element, a longitudinal slot extending along the whole of the mounting rail.

Aside from linking to the mounting rail, the inventive clamp can also be used for linking a threaded rod to the flange. In particular, the threaded rod may be screwed into the lower threaded hole, the clamp being clamped to the flange with a clamping screw disposed in the upper threaded hole. Accordingly, the range of applications is enlarged even further.

In the following, the invention is explained in greater detail by means of a preferred example, which is shown diagrammatically in the accompanying Figures.

BRIEF DESCRIPTION OF THE DRAWINGS

FIG. 1 diagrammatically illustrates a side view of a clamp of the present invention;

FIG. 2 diagrammatically illustrates a front view of the clamp of FIG. 1;

FIG. 3 diagrammatically illustrates a view from above of the clamp of FIG. 1;

FIG. 4 diagrammatically illustrates a perspective view of the clamp of FIG. 1;

FIG. 5 diagrammatically shows the use of a clamp corresponding to FIGS. 1 to 4 for linking a threaded rod to the flange of a beam;

FIG. 6 diagrammatically shows the use of a clamp corresponding to FIGS. 1 to 4 in the longitudinal slot of a mounting rail for linking the mounting rail to the flange of a beam; and FIG. 7 shows the use of a clamp corresponding to FIGS. 1 to 4 at an elongated hole of a clamping rail for linking the clamping rail to the flange of a beam.

DETAILED DESCRIPTION OF THE DRAWINGS

The Figures, particularly FIGS. 1 to 4, show an example of an inventive clamp 1.

The clamp 1 has a bar-shaped lower base 10 with a front base leg 18 and a rear base leg 19, which is aligned with the front base leg 18. Furthermore, the clamp has an upper bar-shaped base 30. The lower base 10 is connected with the upper base 30 by a connecting web 50, which protrudes from an end of the upper base 30 and from a center of the lower base 10. Moreover, the connecting web 50 is between the front base leg 18 and the rear base leg 19 of the lower base 10. The connecting web 50 extends at right angles to the lower base 10 as well as to the upper base 30.

As can be seen particularly in the side view of FIG. 1, the upper base 30, the connecting web 50 and the front base leg 18 of the lower base 10 form an accommodating space 7, which, as shown in FIGS. 5 and 6, can serve to accommodate and fix a flange 71 of a beam 70. As can furthermore be seen in the side view of FIG. 1, the upper base 30, the connecting web 50 and the lower base 10 altogether, that is, comprising the front base leg 18 as well as the rear base leg 19, form a prone µ shape.

The connecting web 50 connects the lower base 10 and the upper base 30 in a bonded manner. The connecting web 50 represents the only connection between the two bases 10 and 30. The lower base 10, the upper base 30 and the connecting web 50 preferably are formed in one piece.

At the front end of the lower base 10, namely, at the front end of the front base leg 18, a T-shaped back-gripping element 2Q is provided. This lower T-shaped back-gripping element 20 consists of a center leg 21, which, in the example shown, is formed completely by the head of the front base leg 18, as well as by the two wings 22 and 23, which protrude from opposite sides of the center leg 21, that is, from the front base leg 18. In the upper base 30, an upper threaded hole 31, corresponding to the lower T-shaped, back-gripping element 20, is provided for a clamping screw 32, the longitudinal axis 33 of the upper threaded hole 31 passing through the lower T-shaped back-gripping element 20.

At the upper base 30, there is, in the extension of the connecting web 50, a further T-shaped back-gripping element 40. This upper T-shaped, back-gripping element 40 also has a center leg 41 as well as two wings 42 and 43, which protrude at opposite sides of the center leg 41 from the center leg 41. In contrast to the lower, T-shaped back-gripping element 20, the center leg 21 of which is formed by the lower base 10 itself, the center leg 41 of the upper, T-shaped back-gripping element 40 is offset from the upper base 30.

A corresponding threaded hole 11 for a clamping screw 12 is assigned also to the upper, T-shaped, back-gripping element 40. This corresponding threaded hole 11 is located in the lower base 10, namely in the rear base leg 19 of the lower base 10, and can, accordingly, also be referred to as a lower threaded hole 11. The longitudinal axis 13 of the lower threaded hole 11 runs parallel and offset to the longitudinal axis 33 of the upper threaded hole 31. Whereas the longitudinal axis 33 of the upper threaded hole 31 intersects the clamp 1 twice, namely in the upper base 30 and in the lower base 10, there in the front base leg 18 and in the lower T-shaped back-gripping element 20, the longitudinal axis 13 of the lower threaded hole 11 intersects the clamp 1 only once, namely in the lower base 10 in the rear base leg 19. The longitudinal axis 13 of the lower threaded hole 11 accordingly is offset with respect to the T-shaped back-gripping element 40.

The wings 42 and 43 of the upper T-shaped back-gripping element 40 extend parallel to the wings 22 and 23 of the lower T-shaped back-gripping element 20. The wings 42 and 43 of the upper T-shaped back-gripping 40 are formed in one piece with the upper base 30, and/or the wings 22 and 23 of the lower T-shaped back-dripping element 20 are constructed in one piece with the lower base 10.

As can be seen particularly in FIG. 2, the wing span wo of the lower T-shaped back-gripping element 20 is larger than the wing span wo of the upper T-shaped back-gripping element 40. The wings 22 and 23 of the lower T-shaped back-gripping element 20 therefore protrude laterally from the lower base 10, so that the wing span $w_{20}$ of the lower T-shaped back-gripping element 20 is larger than the width $w_{10}$ of the lower base 10, measured parallel thereto. The wing span $w_{40}$ of the upper T-shaped back-gripping element 40, on the other hand, corresponds approximately to the width $w_{30}$ of the upper base 30. Moreover, $w_{10}$ is at least approximately as large as $w_{30}$.

The different possible uses of the clamp 1 are shown in FIGS. 5 to 7.

As shown by FIG. 5, the clamp 1 can be used for linking a threaded rod 68 to a flange 71 of a beam 70, which may be constructed particularly as a T-beam or as a double T-beam (I-beam). In this case, the flange 71 is passed into the accommodating space 7 and pressed with a clamping screw 32 in the upper threaded hole 31 against the lower base 10, namely against its front base leg 18. By these means, the clamp 1 can be fixed to the flange 71. The threaded rod 68 is inserted into the lower threaded hole 11.

Moreover, as shown in FIGS. 6 and 7, the clamp 1 can be used for linking a mounting rail 60 to the flange 71 of the beam 70. As can be seen particularly in FIG. 6, such a mounting rail 60 usually has a rail opening 62, which is in the form of a slot and extends over the whole length of the mounting rail 60. Additionally or alternatively, the mounting rail, as shown in FIG. 7, may also have rail openings 64 in the form of elongated holes.

As shown in FIG. 6, the mounting rail 60 can be fixed by the inventive clamp 1 over the slot 62 of the mounting rail 60 at the flange 71 of the beam 70. For this purpose, the lower T-shaped back-gripping element 20 can be bought into the inner space of the mounting rail 60 so that the lower T-shaped element 20 grips with its wings 22 and 23 behind the slot 62. For this purpose, the lower T-shaped back-gripping element 20 is fixed positively to the mounting rail 60. The flange 71 is pushed into the accommodating space 7 and pressed by a clamping screw 32 in the upper threaded hole 31 against the mounting rail 60 and, with that, secured at the mounting rail 60. At the same time, the clamping screw 32 pulls the lower T-shaped back-gripping element 20 upward against the mounting rail 60, securing it also at the mounting rail 60.

So that the lower T-shaped back-gripping element 20 with its wings 22 and 23 can take hold of the slot 62 from behind, the width $w_{10}$ of the lower base 10 must be smaller and, on the other hand, the span $w_{20}$ of the lower T-shaped back-gripping element 20 must be larger than the width of the slot 62. As shown in FIG. 1, the length l of the lower T-shaped back-gripping element 20 along the lower base 10 is selected so that the clamp 1 can be inserted in the slot 62 by rotation and does not have to be pushed in from the end of the mounting rail 60. That offers the possibility of being able to insert the clamp 1 at any desirable place of the mounting rail 60. The free height must be smaller than the rail shoulder height of the mounting rail 60.

As shown in FIG. 7, the mounting rail 60 may also be fastened over its elongated holes 64 to the flange 71 of the beam 70. For this purpose, the clamp 1 is inverted compared to FIG. 6 and the upper T-shaped back-gripping element 40 is bought into the inner space of the mounting rail 60 so that the upper T-shaped back-gripping element 40 takes hold of the elongated holes 64 from behind with its wings 42 and 43. By this structure, the upper T-shaped back-gripping element 40 is fastened positively to the mounting rail 60. The flange 71 is positioned at the rear base leg 19 of the lower base 10 and pressed by a clamping screw 12 in the lower threaded hole 11 against the mounting rail 60 and, with that, secured at the mounting rail 60. At the same time, the clamping screw 12 pulls the upper T-shaped back-gripping element 40 against the mounting rail 60, also securing it at the mounting rail 60.

So that the upper T-shaped back-gripping element 40 can grip the elongated holes 64 from behind with its wings 42 and 43, the width $w_{40}$ of the upper T-shaped back-gripping element 40 must be larger than the width of the elongated holes 64.

The center leg 41 of the upper T-shaped back-gripping element 40 preferably is dimensioned so that the clamp 1 can be inserted into the elongated holes 64 by being turned through an angle of not more than 90°. This ensures a particularly reliable connection. In particular, the center leg 41 may have a flat contacting surface 91 in order to limit the angle of rotation. A curved inlet surface 92 adjoins this contacting surface 91, which faces the upper threaded hole 31 at only one side. On the other hand, at the side opposite to the curved inlet surface 92, the flat contact surface 91 is concluded step-shaped (compare FIG. 4).

As shown particularly in FIGS. 1 to 4, the wings 22, 23, 42 and 43 of the two back-gripping elements 20 and 40 have a denticulation in order to increase the frictional force at the mounting rail 60.

At the opposite sides of the connecting web 50, securing pins 81 and 82 protrude and can prevent the clamp 1 from falling into the slot 62 of the mounting rail 60 while the connection of FIG. 7 is being established.

As shown particularly in FIG. 4, a further borehole, particularly a further threaded borehole 95 may be present in the front base leg 18 of the lower base 10. This additional borehole can improve the versatility even further. The additional borehole may, but does not have to, coincide with the upper threaded borehole 31.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clamp, comprising:
a lower base with a first threaded hole;
an upper base with a second threaded hole;
a connecting web disposed between and connecting the lower base and the upper base;
a lower T-shaped element disposed at the lower base, wherein the lower T-shaped element is aligned with the second threaded hole of the upper base and wherein a rail opening of a mounting rail is grippable by the lower T-shaped element;
an upper T-shaped element disposed at the upper base, wherein an opening of a mounting rail is grippable by the upper T-shaped element; and
a screw, wherein the screw is disposable through the first threaded hole of the lower base or the second threaded hole of the upper base.

2. The clamp according to claim 1, wherein the lower and the upper T-shaped elements each have a center leg and two wings protruding from the center leg.

3. The clamp according to claim 1:
wherein the lower T-shaped element has a wingspan that is larger than a wingspan of the upper T-shaped element;
wherein the wingspan of the lower T-shaped element is larger than a width of the lower base measured parallel to the wingspan of the lower T-shaped element; and
wherein the wingspan of the upper T-shaped element has a smaller width than, or a same width as, a width of the upper base measured parallel to the wingspan of the upper T-shaped element.

4. The clamp according to claim 2, wherein the center leg of the lower T-shaped element is formed by the lower base and wherein the center leg of the upper T-shaped element is offset from the upper base.

5. The clamp according to claim 1, wherein the first and the second threaded holes have a same diameter.

6. The clamp according to claim 1, wherein the upper base, the connecting web, and a portion of the lower base form a U-shape.

7. The clamp according to claim 1, wherein the lower T-shaped element and the upper T-shaped element are arranged in a U-shape.

8. The clamp according to claim 1, wherein the lower T-shaped element is disposed offset from the connecting web at the lower base such that the lower T-shaped element is insertable by rotation in a rail opening.

9. The clamp according to claim 1, wherein a longitudinal axis of the second threaded hole passes through the lower T-shaped element and wherein a longitudinal axis of the first threaded hole is offset from the upper T-shaped element.

10. The clamp according to claim 1, wherein the lower base has a front base leg and a rear base leg, wherein the connecting web is disposed between the front base leg and the rear base leg and protrudes from the lower base, wherein the lower T-shaped element is disposed at the front base leg, and wherein the first threaded hole is disposed at the rear base leg.

11. The clamp according to claim 1, wherein the upper base, the connecting web, and the lower base form a U-shape and wherein the upper base, the lower base, and the connecting web have a same width.

12. The clamp according to claim 1, wherein the connecting web extends between respective longitudinal axes of the first threaded hole and the second threaded hole.

13. The clamp according to claim 1, further comprising two securing pins disposed at the connecting web.

14. The clamp according to claim 1, wherein the lower T-shaped element and the upper T-shaped element include a denticulation.

15. A mounting arrangement, comprising:
   a clamp according to claim 1; and
   a rail;
   wherein a flange is disposable between the rail and an end of the screw.

16. The mounting arrangement according to claim 15, wherein, in an operative configuration, a second end of the screw is disposed in proximity to the upper base or the lower base.

17. The mounting arrangement according to claim 15, wherein, in an operative configuration, the lower T-shaped element is disposed within an inner space of the rail.

18. The mounting arrangement according to claim 15, wherein, in an operative configuration, the upper T-shaped element is disposed within an inner space of the rail.

* * * * *